Oct. 14, 1930.  E. V. BRYANT  1,778,583
VALVE POSITION INDICATOR
Filed Dec. 27, 1929  2 Sheets-Sheet 1
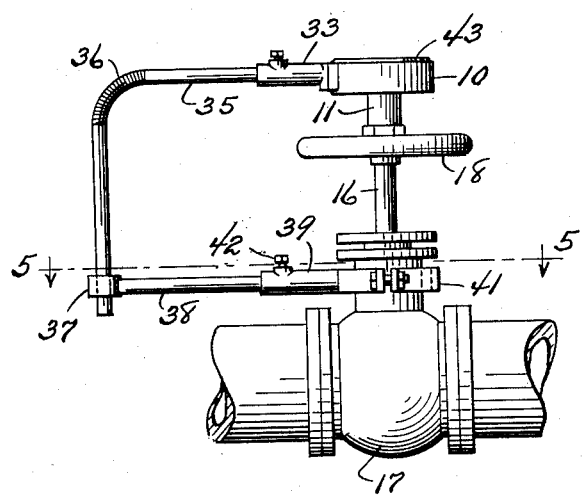
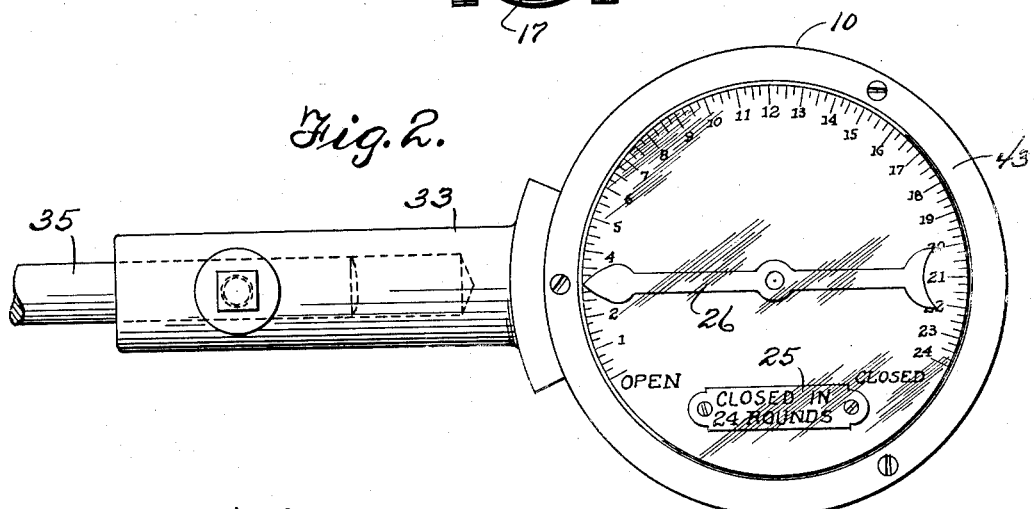
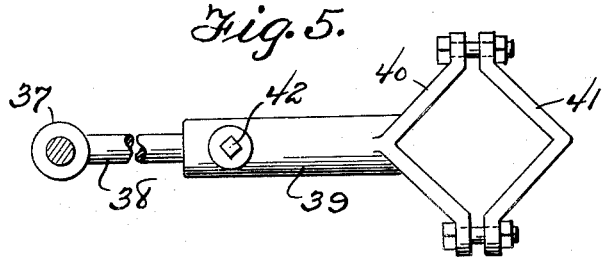
Edmond V. Bryant
INVENTOR
BY Victor J. Evans
ATTORNEY Patented Oct. 14, 1930

1,778,583

UNITED STATES PATENT OFFICE

EDMOND V. BRYANT, OF LODI, OHIO

VALVE-POSITION INDICATOR

Application filed December 27, 1929. Serial No. 416,921.

This invention relates to valve indicators, and has for an object the provision of means which may be removably attached to a valve to indicate the open, closed or intermediate positions of the valve, so that its degree of opening, or its open or closed positions may be determined at a glance.

Another object of the invention is the provision of an indicator which will indicate in revolutions of the valve and fractions thereof, the degree of opening of the valve, so that the position of the valve may be accurately determined.

Another object of the invention is the provision of an indicator which may be used with axially movable or non-axially movable valves.

Another object of the invention is the provision of means for mounting the indicator so as to permit of its use with valves which are worn or out of true.

With the above and other objects in view, the invention further includes the following novel features and details of construction, to be hereinafter more fully described, illustrated in the accompanying drawings and pointed out in the appended claims.

In the drawings:—

Figure 1 is an elevation of a valve with the invention applied.

Figure 2 is an enlarged top plan view of the indicator.

Figure 5 is a detail view taken substantially on the line 5—5 of Figure 1, the valve being omitted.

Figure 3:
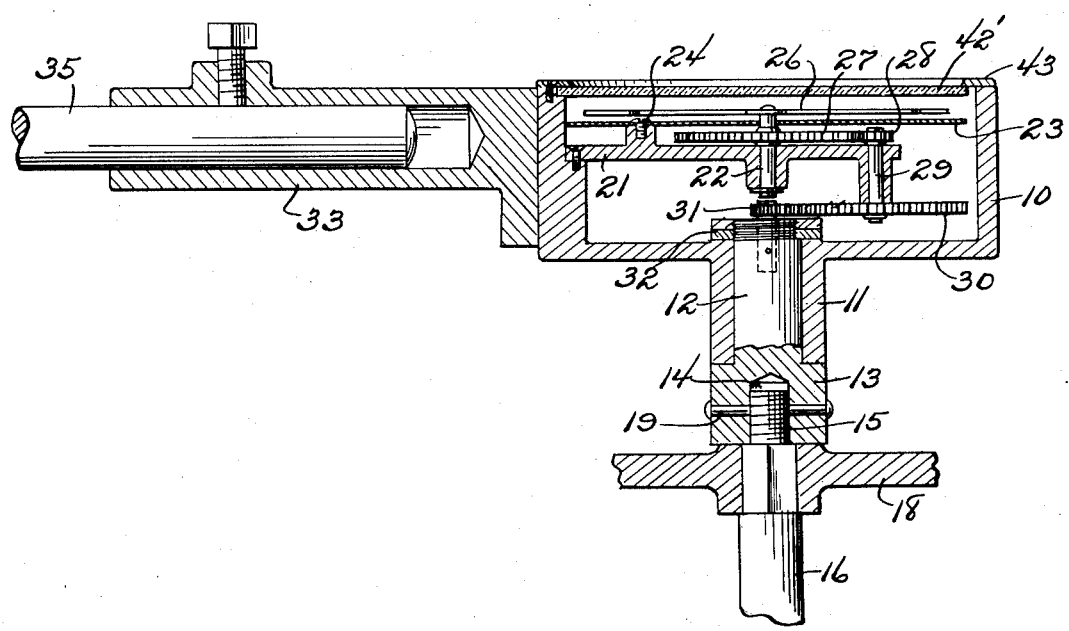
Figure 3 is an enlarged sectional view illustrating the indicator and the manner of mounting the same upon the valve stem.
Figure 4:
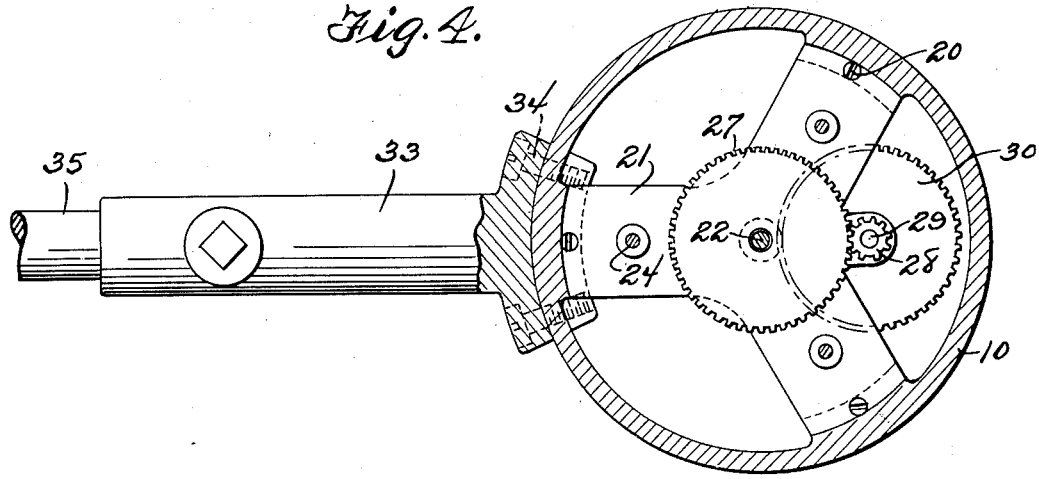
Figure 4 is a horizontal sectional view.

Referring to the drawings in detail wherein like characters of reference denote corresponding parts, the reference character 10 indicates the casing which is provided with a sleeve 11. This sleeve extends downward from the bottom of the casing and provides a bearing for a stud 12 which is shouldered as shown at 13, so as to form a bearing for the end of the sleeve.

The stud 12 is provided with a threaded socket 14 which receives the threaded extension 15 of the stem 16 of a valve 17. A hand wheel 18 is mounted upon the stem 16 whereby the valve may be operated in the usual manner.

In positioning the indicator, the usual nut which holds the hand wheel in place is removed and the stud 12 is substituted. A pin 19 may be used to securely hold the stud in place.

The casing 10 is circular in shape and has secured therein as shown at 20, a spider 21. This spider carries a bearing for a stub shaft 22 which extends upward through a dial 23, the latter being secured to the spider as shown at 24, so that the dial is rigid with the casing.

The dial 23 is graduated and numbered as shown in Figure 2 of the drawings, and each of these numbers represents one complete rotation of the valve stem in opening and closing the valve. Intermediate graduations are also provided upon the dial so that a complete rotation or any fraction thereof may be indicated.

Frequently valves of the same type vary in the number of rotations necessary to move them from a fully open to a fully closed position and vice versa. For example, the valve may require twenty-four complete revolutions or "rounds" from the fully opened to the fully closed position and this number is indicated by a removable plate 25 which is attached to the dial. This plate indicates that the valve is closed in twenty-four rounds and where only twenty-two or twenty-three rounds would be required to close the valve, a different plate would be substituted.

Mounted upon the stub shaft 22 is an indicator or pointer 26 which travels over the graduations or indicia of the dial, the pointer moving from one to two, etc. at each complete revolution of the valve stem.

For the purpose of operating the pointer, the shaft 22 has secured thereon a gear 27 which is engaged and driven by a pinion 28 which is mounted upon a shaft 29 also carried by the spider 21. The shaft 29 has fast thereon a gear 30 which is driven by a pinion 31 fast with the stud 12. As the stud is rotatable within the sleeve 11, rotation of the valve stem will operate the pointer through the train of gears just described. The upper end of the stud 12 is threaded to receive nuts 32 so as to hold the parts properly assembled.

Obviously, some means must be provided for holding the casing against rotation in order that the dial may remain stationary while the pointer is rotated. For this purpose, a sleeve 33 is secured to the casing as shown at 34 and removably and adjustably positioned within this sleeve is one end of a rod or bar 35. This rod or bar is of sectional formation and its sections are connected by means of a coiled spring 36. The other end of the bar is slidable within an eye 37 provided in a rod 38 which is removably and adjustably secured within a sleeve 39 carried by one member of a clamp 40. A clamping member 41 cooperates with the member 40 and provides means whereby the sleeve 39 may be clamped upon the valve 17. Binding screws 42 serve to hold the ends of the rods 35 and 38 within the sleeves.

It will be apparent from the foregoing description and accompanying drawings that when the hand wheel is operated the pointer 26 will be moved in the manner previously described to indicate the position of the valve. In other words, when the pointer is at one end of the graduations it will indicate that the valve is closed, while at the other end, the pointer will indicate the open position of the valve. When it is desired to close the valve, the hand wheel is operated and the pointer moves in a clockwise direction and the operator knows that when the pointer is upon the graduation 24 that the valve is fully closed. This is especially useful in the event of something interfering with the operation of the valve as the operator will, by means of the indicator, know whether or not the valve is fully closed or fully open.

Any intermediate position of the valve may also be indicated by the numerals on the dial. For example, when the pointer reaches the numeral 12, the operator will know that the valve is half open.

As the valve stem moves upward and downward in its opening and closing operations, the end of the rod 35 will slide through the eye 37. The spring section 36 in the rod 35 will allow for worn or disaligned valves.

In addition, the form of connection between the indicator casing and the valve is such as to permit of the use of a wrench on the hand wheel to obtain increased leverage in the event the valve is stiff and hard to operate.

The top of the casing is closed by means of a lens 42' which is held in place by a removable annulus 43.

The invention is susceptible of various changes in its form, proportions and minor details of construction and the right is herein reserved to make such changes as properly fall within the scope of the appended claims.

Having described the invention what is claimed is:—

1. An indicator attachment for valves comprising a casing, an indicating dial therein stationary with the casing, a pointer movable over the dial, gearing arranged within the casing and operatively connected with the pointer, means to connect the gearing with the stem of a rotary valve, whereby when the valve stem is rotated the pointer will be moved, and means to hold the casing against rotary movement.

2. The combination with a valve having a rotary stem, of a casing mounted upon the stem, a dial rigid with the casing, a pointer movable over the dial, means to move the pointer when the valve stem is rotated, indicia upon the dial in the path of the pointer to indicate a position of the valve, and means to hold the casing against rotation.

3. The combination with a valve having a rotary stem, of a casing, a sleeve extending axially from the casing, a stud secured to the stem and rotatable within the sleeve, an indicating dial fast within the casing and having indicia therein, a pointer movable over the dial, means to prevent rotation of the casing, and means providing a driving connection between the stud and pointer to operate the latter when the valve stem is rotated.

4. The combination with a valve having a rotary stem, of a casing, a sleeve extending axially from the casing, a stud secured to the stem and rotatable within the sleeve, an indicating dial fast within the casing and having indicia therein, a pointer movable over the dial, vertically slidable means to prevent rotation of the casing, and means providing a driving connection between the stud and dial to operate the latter when the valve stem is rotated.

5. The combination with a valve having a rotary stem, of a rigidly mounted dial having indicia thereon indicating the number of revolutions of the stem necessary to move the valve from a fully closed to a fully open position, a pointer mounted for movement over the dial, and means operated by manual rotation of the valve stem to move the pointer and determine by the number of revolutions indicated by the pointer, the open, closed or intermediate positions of the valve.

6. In combination, a valve having a rotary and axially movable stem, an indicator mounted upon the stem and including a housing, means operated by rotation of the valve stem to indicate within the housing the position of the valve, and means providing a flexible connection between the casing and valve to hold the casing against rotary movement.

In testimony whereof I affix my signature.

EDMOND V. BRYANT.